June 1, 1937.  G. H. STONER  2,082,229
VEHICLE BRAKE
Filed Feb. 7, 1935    2 Sheets-Sheet 1
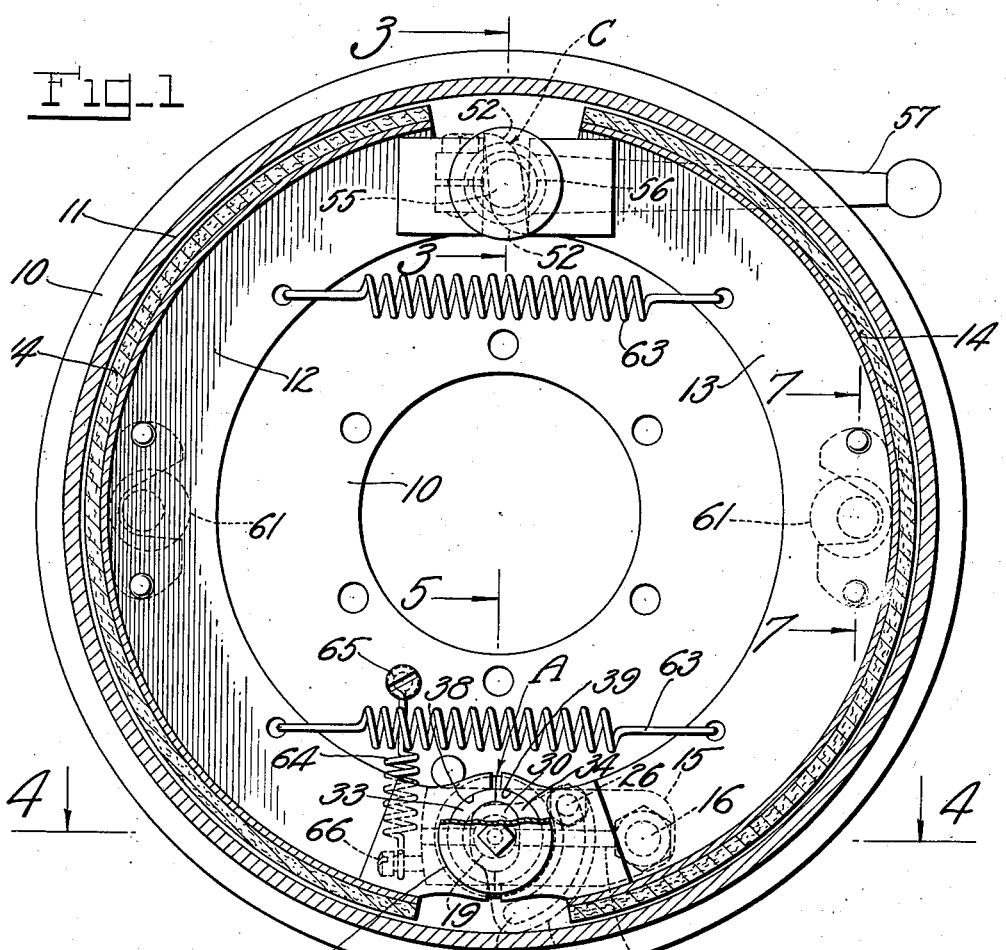
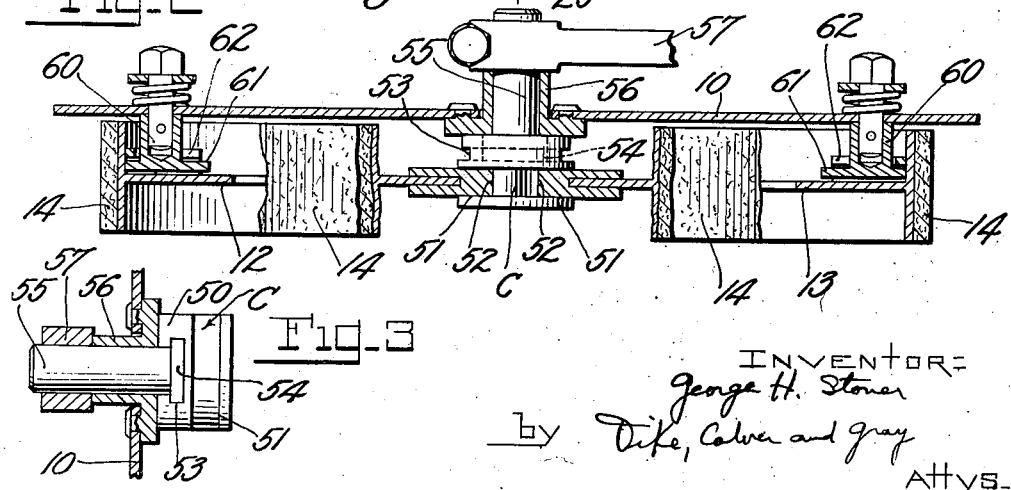
INVENTOR:
George H. Stoner
by Dike, Calver and Gray
Attys.

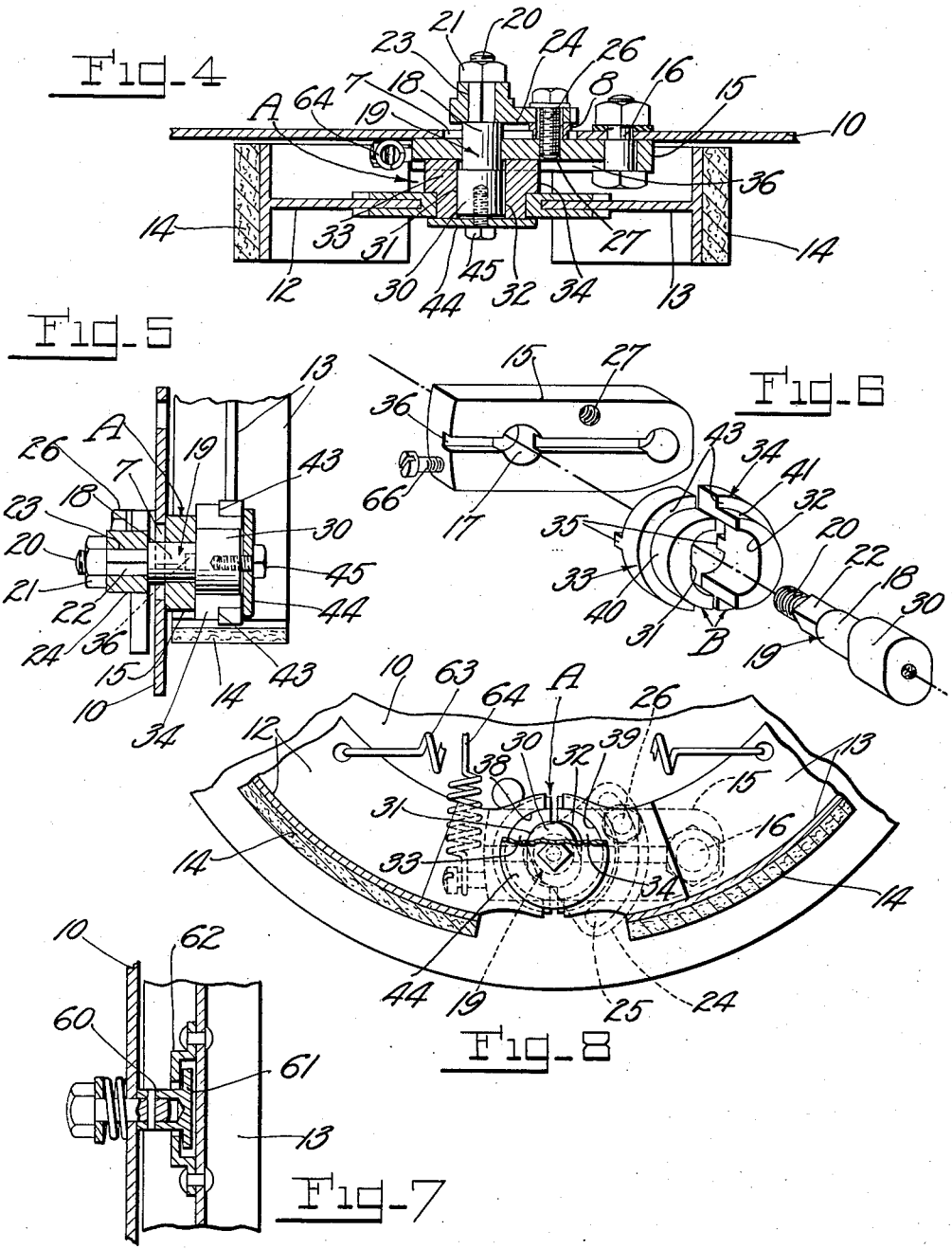

Patented June 1, 1937

2,082,229

UNITED STATES PATENT OFFICE 2,082,229

VEHICLE BRAKE

George H. Stoner, East Boston, Mass., assignor, by mesne assignments, to Tru-Arc, Inc., Boston, Mass., a corporation of Massachusetts Application February 7, 1935, Serial No. 5,410

5 Claims. (Cl. 188—79.5)

This invention relates to vehicle brakes of the internal expanding type and more specifically to brakes of this type in which the brake shoes are mounted upon an anchor which is movably carried by the backing plate.

It is an object of the invention to provide a simple arrangement whereby the brake shoes may be adjusted to provide the desired clearance between the same and the rotatable drum to compensate for wear of the brake lining. The invention is especially adapted for use in the type of vehicle brake in which the brake shoes are mounted upon an anchor which is movably carried by the backing plate.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention will be more clearly understood from the following description in conjunction with the accompanying drawings, in which:

Fig. 1 is a sectional elevational view of a vehicle brake embodying the invention.

Fig. 2 is a plan view partly in section and partly broken away, the drum being omitted.

Fig. 3 is a section taken on line 3—3 of Fig. 1.

Fig. 4 is a sectional view taken on the line 4—4 of Fig. 1.

Fig. 5 is a sectional view taken upon the line 5—5 of Fig. 1.

Fig. 6 is an enlarged detail perspective view of a portion of the brake showing the parts separated.

Fig. 7 is a sectional view taken upon the line 7—7 of Fig. 1.

Fig. 8 is a fragmentary view similar to that of Fig. 1 but showing the parts in a different position.

One embodiment of the invention is illustrated in Figs. 1 to 8 inclusive of the accompanying drawings and comprises a backing plate 10 adapted to be fixed to a stationary part of the vehicle and a rotatable drum 11 adapted to be mounted upon a vehicle wheel. A pair of brake shoes 12 and 13, each having a suitable brake lining 14 fixed upon its outer surface, are pivotally carried by an anchor assembly A which is movably carried by the backing plate 10.

The anchor assembly A comprises an arm 15 one end of which is pivotally mounted upon a stud 16 fixed in the backing plate 10. The arm 15 is provided near its other end with a bearing surface 17 adapted to rotatably receive the intermediate portion 18 of a shaft 19. One end of the shaft 19 projects through a hole 7 of greater diameter in the backing plate and is provided with a threaded portion 20 adapted to receive a nut 21. Between the portions 18 and 20, the shaft 19 is provided with a portion 22 of square cross section adapted to engage the square hole 23 of a locking plate 24 having an arcuate slot 25. The locking plate 24 is secured to the arm 15 by a screw 26 passing through the slot 25 in said plate and the hole 7 in the backing plate and engaging a threaded hole 27 in the arm 15 to lock the shaft 19 upon the arm 15 and prevent relative movement therebetween. The screw 26 also passes through a washer 8 which is interposed between the plate 24 and the arm 15.

The other end of the shaft 19 is provided with a cam 30 adapted to engage the inner surfaces 31 and 32 of a split bearing B having portions 33 and 34. The portions 33 and 34 of the split bearing B are each provided with a tongue 35 adapted to slidably engage a groove 36 formed in one face of the arm 15. The adjacent ends of the brake shoes 12 and 13 are formed with bearing surfaces 38 and 39 respectively of cylindrical shape adapted to engage the cylindrically-shaped bearing surfaces 40 and 41 (see Fig. 6) formed upon the outer surface of the portions 33 and 34 respectively of the split bearing B. The adjacent ends of the brake shoes 12 and 13 are held between shoulders 43, formed upon the portions 33 and 34 of the split bearing, and a cap plate 44 secured upon the outer end of the cam 30 by a screw 45.

Preferably, the brake shoes 12 and 13 are moved outwardly into engagement with the drum 11 by a floating cam C which may be of any suitable construction. As illustrated, the cam C comprises a cylindrical block 50 having diametrically opposite grooves 51 formed in its periphery. The bottom surfaces of the grooves 51 are shaped to provide cam surfaces 52. One face of the block 50 is provided with a T-shaped slot 53 adapted to receive the rectangular-shaped head 54 formed upon the end of a shaft 55 which is mounted for rotation in a bearing 56 fixed in the backing plate 10. A crank 57 is fixed upon the other end of the shaft 55 and is operatively connected in any suitable manner with the vehicle brake operating mechanism. The unsupported ends of the brake shoes 12 and 13 are received in the grooves 51 so as to be engaged by the cam surfaces 52. If desired the brake shoes 12 and 13 may be centered and guided in their movement by centering and guiding devices 60 carried by the backing plate 10 and having a T-shaped head 61 adapted to be received in a pocket formed between the web of the brake shoe and an off-set plate 62 suitably secured thereto.

The brake shoes 12 and 13 are normally held in their retracted position out of engagement with the brake drum 11 by springs 63 extending therebetween and also by a spring 64 one end of which is connected to a stud 65 fixed upon the backing plate 10 and the other end of which is connected to a stud 66 fixed in the free end of the arm 15.

When the brake linings 14 have become worn so that it is desirable to adjust the brake shoes 12 and 13 to provide the desired clearance between the brake linings 14 and the drum 11, the screw 26 is loosened to unlock the plate 24 so as to permit the latter and the shaft 19 to be rotated. As the shaft 19 is rotated the portions 33 and 34 of the split bearing B are moved outwardly in substantially opposite directions so as to bring the brake shoes 12 and 13 closer to the inner surface of the drum 11 to provide the desired clearance therebetween when the brake shoes are in their released or retracted position. The screw 26 is then tightened to lock the plate 24 and the shaft 19 upon the arm 15.

I claim:

1. In a vehicle brake, in combination, a rotatable brake drum, a backing plate, a pair of brake shoes, and means carried by said backing plate and movable relative thereto for supporting said shoes, said means including a member adapted to be adjustably positioned thereon to change the position of said shoes relative to said drum, bearings interposed between said member and said shoes, and means for slidably guiding said bearings.

2. In a vehicle brake, in combination, a rotatable brake drum, a backing plate, an arm having one end pivotally mounted on the backing plate, a pair of brake shoes, and means carried by said arm for supporting said shoes, said means including a member adapted to be adjustably positioned on said arm to change the position of said shoes relative to said drum.

3. In a vehicle brake, in combination, a rotatable brake drum, a backing plate, an arm having one end pivotally mounted on the backing plate, a pair of brake shoes, and means carried by said arm for supporting said shoes, said means comprising a member movably mounted on said arm to adjust the position of said shoes relative to said drum, and means for locking said member on said arm.

4. In a vehicle brake, in combination, a rotatable brake drum, a backing plate, an arm having one end pivotally mounted on the backing plate, a pair of brake shoes, and means carried by said arm for supporting said shoes, said means comprising bearings adapted to be rotatably engaged by adjacent ends of said shoes, a member movably mounted on said arm adapted to engage said bearings to move the same toward said drum when said member is moved relative to said arm, means for slidably guiding said bearings toward said drum, and means for locking said member on said arm.

5. In a vehicle brake, in combination, a rotatable brake drum, a backing plate, an arm having one end pivotally mounted on the backing plate, a pair of brake shoes, and means carried by said arm for supporting said shoes, said means comprising bearings adapted to be rotatably engaged by adjacent ends of said shoes, a shaft rotatably mounted in said arm, a cam carried by said shaft adapted to engage said bearings to move the same toward said drum, means for slidably guiding said bearings toward said drum, and means for locking said shaft on said arm.

GEORGE H. STONER.